United States Patent [19]

Fisher et al.

[11] Patent Number: 5,191,330
[45] Date of Patent: Mar. 2, 1993

[54] BINARY FOR PENTERNARY (FIVE-LEVEL) ENCODING SYSTEM

[75] Inventors: David A. Fisher, Saffron Walden; Daniel R. Donovan, Gt Dunmow, both of United Kingdom

[73] Assignee: Northern Telecom Limited, Montreal, Canada

[21] Appl. No.: 806,723

[22] Filed: Dec. 12, 1991

[30] Foreign Application Priority Data

Dec. 12, 1990 [GB] United Kingdom ............... 9026996

[51] Int. Cl.⁵ .............................................. H03M 7/06
[52] U.S. Cl. ...................................... 341/56; 341/106
[58] Field of Search ........................... 341/50, 56, 106

[56] References Cited

U.S. PATENT DOCUMENTS 3,337,863  8/1967  Lender ................................ 341/56
3,832,490  8/1974  Leonard .............................. 341/56
4,628,297 12/1986  Mita et al. .......................... 341/56

Primary Examiner—Marc Hoff
Attorney, Agent, or Firm—Lee, Mann, Smith, McWilliams, Sweeney & Ohlson

[57] ABSTRACT

A digital data transmission system wherein binary coded data to be transmitted over the system is converted into a five-level (penternary or quinternary) line code prior to transmission over the system and is reconverted to binary data after transmission over the system. The choice of penternary word is conditional on the previous penternary word.

9 Claims, 1 Drawing Sheet

BINARY FOR PENTERNARY (FIVE-LEVEL) ENCODING SYSTEM

FIELD OF THE INVENTION

This invention relates to a data transmission system in which the data to be transmitted is expressed in a binary code which is converted into a multilevel line code before transmission.

BACKGROUND TO THE INVENTION

One example of such a multilevel code is the code described in our U.S. Pat. No. 3,611,141, where the code is of the 4B3T type, which means that successive groups each of four binary bits are converted for transmission into groups of three ternary elements. Another example is the equally well-known 3B2T line code.

SUMMARY OF THE INVENTION

According to the present invention there is provided a digital data transmission system including a transmission equipment comprising means for sampling an input set of binary encoded digital data bits, means for converting the sampled binary encoded set into a selected five-level (penternary or quinternary) line code word for transmission over the system, means for storing each five-level word output from the converting means for a predetermined period of time and means for controlling the selection of a succeeding five-level word conditional on the value of the stored five-level word.

In a first embodiment of the invention the binary to five-level conversion is of the 2B1P type, wherein each successive group of two binary coded bits is converted into a single five-level bit, the equivalent five-level line code employing a predetermined one of all the five level states.

In a second embodiment of the invention the binary conversion is of the 9B4P type wherein each successive group of nine binary coded bits is converted into a group of four five-level bits, the equivalent five-level line code employing a predetermined one of all of the combinations of four out of five five-level states.

BRIEF DESCRIPTION OF THE DRAWINGS

Embodiments of the invention are described with reference to the accompanying drawings, in which.

DESCRIPTION OF THE PREFERRED EMBODIMENTS

Code variant 2B1P is a five-level line code in which successive sets of two binary elements are coded into one penternary element, wherein the penternary code employs all of the following five penternary elements:

= − 0 + #

For example:

|  | Activity | State | Representation |
|---|---|---|---|
|  | — | 0 | = |
| Penternary | — | 1 | − |
| Code symbol with | — | 2 | 0 |
| state 3 set | XX | 3 | + |

-continued

| Activity | State | Representation |
|---|---|---|
| — | 4 | # |

(— indicated state not in use. XX indicates state in use)

Code variant 9B4P is a penternary line code in which successive sets of nine binary elements are coded into successive sets of four penternary elements, wherein the penternary line code employs all of the six hundred and twenty-five sets of four penternary elements, an example sub-set of which is given below:

| #### | ###+ | ###0 | ###− | ###= |
|---|---|---|---|---|
| ##+# | ##++ | ##+0 | ##+− | ##0= |
| ##0# | ##0+ | ##00 | ##0− | ...etc... |

Each code variant employs conditional code word selection whereby the current set of penternary elements or the current penternary code word to be transmitted is dependent on previously transmitted code words.

Penternary Line Codes

The line code and its variants herein described are suitable for use in a variety of applications, and particularly for the transmission over twisted wire cables at data rates in the region of 448 Kbit/s. The line code is also suited to data transmission rate from circa 144 Kbit/s to the order of 3 Mbit/s.

The coder produces a series of symbols containing five discrete states referred to as a penternary (or quinternary) line code.

At any instant the code symbol may have one or none of five values or states. The value or state set/selected is dependent on the data being coded and/or dependent on any number of previous code symbols. The data to be coded may be in any number base or format.

Specific Variants of the Coding Scheme

Conditional 2B1P

2B1P—Two binary bits encoded as one penternary/quinternary/five-level code symbol, with and without conditional code word selection.

This variant of the coder is a state machine which encodes two binary bits as one penternary symbol or code word. One of the four states represented by the two-bit binary word is mapped into one of the five states of the penternary code. The exact mapping is not fixed (conditional) and may be varied to use any of the five levels in order to adapt the energy spectrum of the transmitted penternary encoded data according to requirements. The mapping can be made to be dependent on previously transmitted code words thus making the most efficient use of network transmission bandwidth. The unused penternary state resulting from the mapping can be used for overhead, synchronisation and management control or transmission of extra data.

Figure 1:
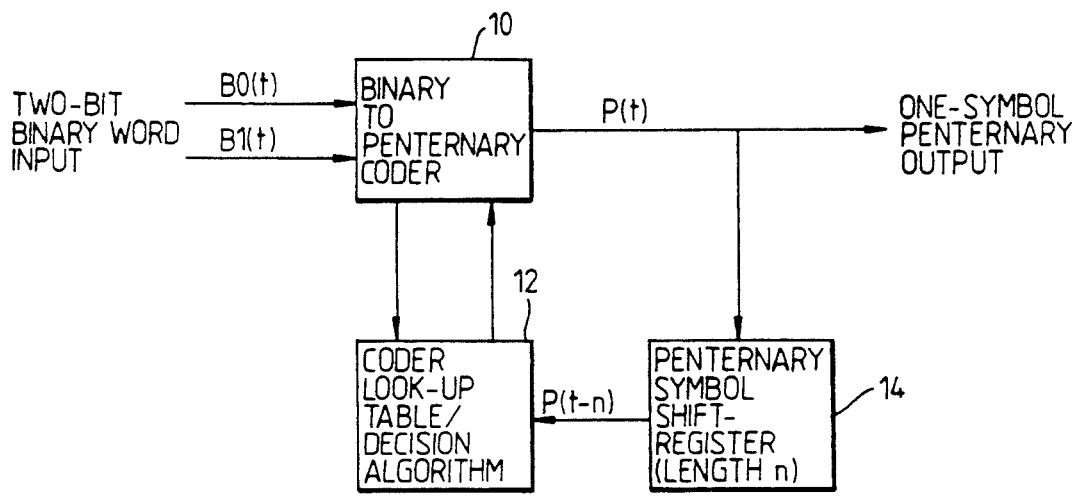
FIG. 1 illustrates an example of implementation of a 2B1P binary to penternary coder.

With reference to FIG. 1, the 2B1P coder 10 samples the two-bit binary word comprising B1(t) and B2(t) at sample time 't'. The coder uses a look-up table 12 or code word decision algorithm to select the penternary symbol to be transmitted, P(t). P(t) is dependent on P(t−n), which is the previously transmitted penternary symbol for the case where n=1. The selected penternary symbol is transmitted and also stored in a penternary shift register 14 of length 'n' time samples. This new stored symbol P(t) is then used 'n' time samples later to process B1(t−n) to select symbol P(t+n).

Example mapping table for binary data with a unit delay shift register.

| Binary Weight | Binary Word | Penternary Output | | | | |
|---|---|---|---|---|---|---|
| | | = | − | 0 | + | # |
| 0 | 00 | = | − | 0 | + | # | (P(t-1)) |
| 1 | 01 | − | 0 | + | # | + | P(t) |
| 2 | 10 | 0 | + | # | 0 | 0 | |
| 3 | 11 | + | = | − | − | − | |

Conditional 9B4P

Figure 2:
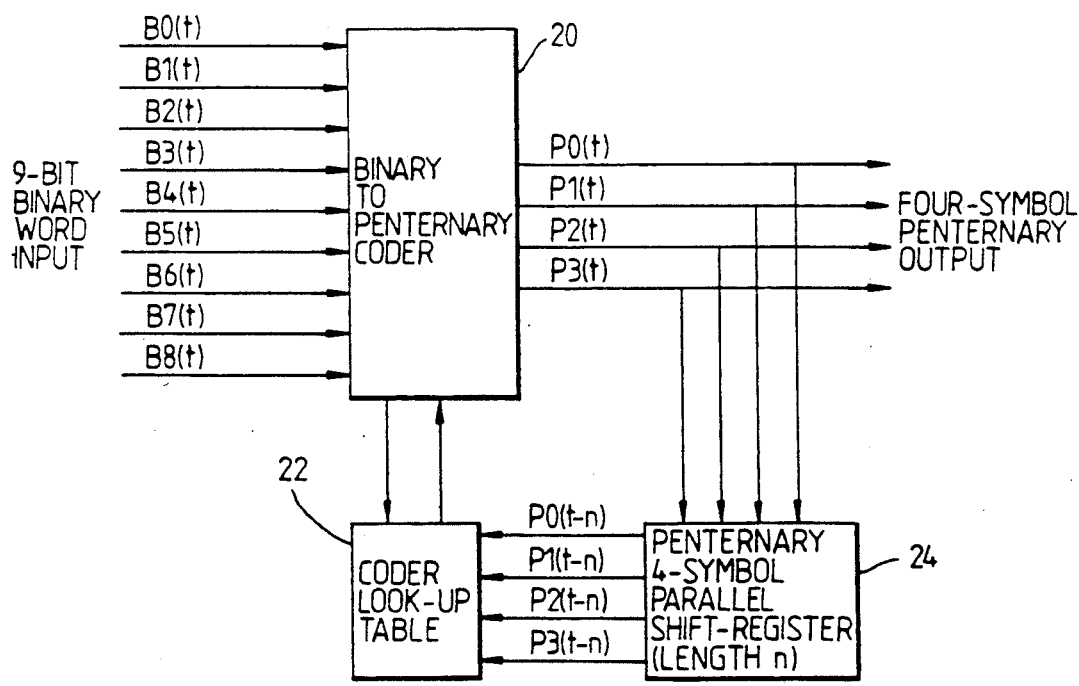
FIG. 2 illustrates an example of implementation of a 9B4P binary to penternary coder.

This variant of the code encodes nine binary bits into a four penternary-symbol word. With reference to FIG. 2 the binary to penternary coder 20 samples the 9-bit binary word comprising bits B0(t)−B8(t) at sample time 't'. The coder accesses look-up table 22 to select the 4-bit penternary code group (P0(t)−P3(t)) to be transmitted. P0(t)−P3(t) is dependent on a preceding group P0(t−n)−P3(t−n), which is the immediately preceding group when n=1. The selected group P0(t)−P3(t) is transmitted and also stored in penternary 4-symbol parallel shift register 24. The shift register has a length equal to n words. The newly stored group P0(t)−P3(t) is then used 'n' time samples later to process the binary group B0(t+n)−B8(t+n) to select penternary group P0(t+n)−P3(t+n). The data compression ratio is greater than that for 2B1P. Conditional selection of a subset of the 625 penternary words is made and only words which have the required spectral content are used for data encoding. The remaining words can be used for system overhead and synchronisation or data transmission. The code word selection mechanism conditionally selects the code word depending on the frequency content of the current four symbol penternary code word and previously transmitted words. The selection process may be varied to make optimum use of the network bandwidth.

EXAMPLE OF 9B4P MAPPING

| Binary Weight | Binary Word | Penternary Output P(t) | |
|---|---|---|---|
| 0 | 000000000 | = = = = | |
| 1 | 000000001 | = = = − | |
| 2 | 000000010 | = = = 0 | |
| 3 | 000000011 | = = = + | |
| 4 | 000000100 | = = = # | |
| 5 | 000000101 | = = − = | |
| 6 | 000000110 | = = 0 = | |
| 7 | 000000111 | = = + = | specially selected |
| 8 | 000001000 | = = # = | 512 sub-set of 625 |
| 9 | 000001001 | = − = = | penternary code |
| 10 | 000001010 | = 0 = = | words, dependent |
| 11 | 000001011 | = + = = | on previously |
| 12 | 000001100 | = # = = | transmitted code |
| 13 | 000001101 | − = = = | words. |
| 14 | 000001110 | 0 = = = | |
| 15 | 000001111 | + = = = | |
| 16 | 000010000 | # = = = | |
| 17 | 000010001 | # = = − | |

| Binary Weight | Binary Word | Penternary Output P(t) |
|---|---|---|
| ..etc.. | ..etc.. | ..etc.. |

We claim:

1. A digital data transmission system including transmission equipment comprising means for sampling an input set of binary encoded digital data bits, means for converting the sampled binary encoded set into a selected five-level (penternary or quinternary) line code word for transmission over the system, means for storing each five-level word output from the converting means for a predetermined period of time and means for controlling the selection of a succeeding five-level word conditional on the value of the stored five-level word.

2. A system according to claim 1 wherein the binary to five-level conversion is of the 2B1P type, wherein each successive group of two binary coded bits is converted into a single five-level bit, the equivalent five-level line code employing a predetermined one of all the five level states.

3. A system according to claim 1 wherein the binary conversion is of the 9B4P type wherein each successive group of nine binary coded bits is converted into a group of four five-level bits, the equivalent five-level line code employing a predetermined one of all the combinations of four out of five-level states.

4. A system according to claim 1 wherein the means for converting comprises a five-level code word look up table containing for each possible binary encoded input set a plurality of predetermined alternative five-level code words the selection of a five-level code word from the look-up table being conditional on the value of the stored five-level code word.

5. A system according to claim 4, wherein each five-level word output from the converting means is stored for a period of time corresponding to one five-level word duration.

6. A system according to claim 1 wherein the means for converting comprises a five-level code word decision algorithm means arranged to generate for each possible binary encoded input set one of a plurality of predetermined alternative five-level code words conditional on the value of the stored five-level code word.

7. A system according to claim 6 wherein successive sets of binary elements forming multi-bit binary groups are coded into successive sets of five-level elements forming five-level words, each five-level word having fewer elements than the corresponding binary group, wherein the selection of a five-level code word corresponding to the binary groups is restricted to a predetermined subset of the total number of possible five-level words corresponding to the group.

8. A system according to claim 7 wherein each five-level word output from the converting means is stored for a period of time corresponding to one five-level word duration.

9. A system according to claim 6 wherein each five-level word output from the converting means is stored for a period of time corresponding to one five-level word duration.

* * * * *